United States Patent [19]
Hiestand

[11] Patent Number: 4,507,031
[45] Date of Patent: Mar. 26, 1985

[54] POWER CHUCK FOR TURNING MACHINES

[75] Inventor: Karl Hiestand, Pfullendorf, Fed. Rep. of Germany

[73] Assignee: SMW Schneider & Weisshaupt GmbH, Fed. Rep. of Germany

[21] Appl. No.: 395,718

[22] Filed: Jul. 6, 1982

[30] Foreign Application Priority Data

Jul. 11, 1981 [DE] Fed. Rep. of Germany ....... 3127527

[51] Int. Cl.³ ............................................ B23B 31/14
[52] U.S. Cl. ................................ 409/234; 279/1 C; 279/121
[58] Field of Search ............. 279/1 C, 117, 121, 114, 279/110; 409/234, 232

[56] References Cited

U.S. PATENT DOCUMENTS 4,094,522  6/1978  Hiestand ......................... 279/121 X
4,130,290 12/1978  Röhm ................................. 279/121

FOREIGN PATENT DOCUMENTS

2025808  1/1980  United Kingdom ............... 279/1 C

Primary Examiner—William R. Briggs
Attorney, Agent, or Firm—McGlew and Tuttle

[57] ABSTRACT

A power chuck for turning machines, comprises a chuck body having an axis of rotation on which is slidably mounted a plurality of radially extending clamping jaws. Each clamping jaw is engaged with its own tangentially extending and slidable wedge bar. Each wedge bar is engaged with a radially extending push bar which is movable by an axially movable control member so that movement of the control member moves the push bar 1 in a radial direction and through the engagement thereof with the wedge bar and the engagement of the wedge bar and the clamping jaw, moves the clamping jaw in an opposite radial direction. The masses and transmission ratios of the push bar, wedge bar and clamping jaw can be selected to equalize the centrifugal force applied to the clamping jaw and push bar so that no excess force is applied to the clamping jaw when the chuck body rotates.

14 Claims, 8 Drawing Figures

POWER CHUCK FOR TURNING MACHINES

FIELD AND BACKGROUND OF THE INVENTION

The present invention relates in general to turning machines and in particular to a new and useful arrangement for power operated chucks for such turning machines.

Power operated chucks for turning machines which include radially adjustable master or clamping jaws, have tangentially extending wedge bars which are drivable and engaged with the clamping jaws for actuating the jaws.

A chuck of this kind has proved to be very satisfactory in practice and is known from U.S. Pat. No. 4,094,522 German (AS No. 25 56 227). In this design, the control member is provided with flat or curved wedge surfaces which extend in the direction of the wedge bars and are inclined in the direction of diplacement thereof and cooperate with opposite surfaces provided on the wedge bars. Even though that chuck comprises only few parts, and is thus not very susceptible to trouble and in inexpensive to manufacture, experience has shown, especially with numerically controlled machine tools, that at high speeds, the inwardly directed clamping force is reduce by the opposite centrifugal forces acting on the jaws, or, with an inside chucking, the forces add, because no compensation for the centrifugal forces is provided. It has further been found that with a direct engagement of the control member in wedge bars by means of radially projecting extensions formed thereon, the chucking capacity is affected. Therefore, in this chuck, the spindle passage area cannot be enlarged easily without unfavorably affecting the jaw guides or taking some other special measures.

SUMMARY OF THE INVENTION

The present invention is directed to a chuck of the above mentioned kind in which the jaws are actuable by means of an axially displaceable control member, and which, while having a small overall constructional length and being very reliable in operation, is suitable not only for strong clamping forces, but also includes simple means for completely compensating for the centrifugal forces acting on the jaws. Further, in spite of the inexpensive construction, according to the invention it is possible to obtain a large clear inside diameter without shortening the guideways of the jaws, so that large-diameter or workpiece can also be clamped such as borehole casing pipes.

Accordingly, an object of the present invention is to provide a power operated chuck for a turning machine comprising, a chuck body having an axis of rotation, at least one clamping jaw radially movable on the chuck body, a wedge bar movable substantially tangentially of the axis and engaged with the clamping bar, a push bar radially movable on the chuck body engaged with the wedge bar so that movement of the push bar in one radial direction causes movement of the clamping jaw in an opposite radial direction, a control member axially movable on the chuck body and engagement means connected between the control member and the push bar for transferring axial movement of the control member into radial movement of the push bar.

The push bar acts as an intermediate member between the control member and the wedge bar.

According to another feature of the invention, the engagement between the wedge bar and the push bar comprises a groove extending at an angle to the radial direction of said chuck body defined in one of the wedge and push bars and an extension defined on the other of the wedge bar and push bar engaged in the groove, the engagement between the push bar and the clamping jaws established by engaged teeth defined on the wedge bar and clamping jaw extending at an angle to the radial direction of the chuck body.

A still further object of the invention is to provide such a power operated chuck wherein angles of inclination of the groove, extension and teeth are equal or chosen to modify a transmission ratio of forces between the push bar, wedge bar and clamping jaw.

Another object of the invention is to provide such a chuck wherein the mass of the push bar and clamping jaw as well as the transmission ratio between the push bar, wedge bar and clamping jaw are selected so that with the chuck body rotated, the centrifugal force acting on said clamping jaw equals the force applied to the clamping jaw through said push bar, due to centrifugal force acting on said push bar.

A still further object of the invention is to provide such a power operated chuck wherein the clamping jaw includes a radially inwardly positioned oblique surface which extends at an angle to the chuck body radius which cooperates with a mating surface defined on the control member for movement of the clamping jaw to retract the clamping jaw away from a direction to which it is pushed by the push bar and wedge bar.

Another object of the invention is to provide such a power operated chuck wherein, for disengaging the clamping jaw from the wedge bar, the wedge bar is provided at a radially outwardly facing surface thereof an angular recess into which extends a cam portion of a bolt rotatably mounted to the chuck body.

Another object of the invention is to provide a power operated chuck which is simple in design, rugged in construction and economical to manufacture.

The power chuck designed in accordance with the invention is not only inexpensive, very reliable in operation, and dimensionally stable, but, due to the provided intermediate members which are designed as push bars and actuable by the control member and are positively connected through wedge drives to the wedge bars, the power chuck is capable of competely compensating for the centrifugal forces to which the jaws are exposed, since the centrifugal forces acting on the push bars are taken up by the jaws through the deflection members. This reliably eliminates both a clamping force reduction during an outside chucking, that is with the clamping force directed inwardly, and a clamping force augmentation or increases during an inside chucking, that is with the clamping force directed outwardly. The clamping force rather remains constant irrespective of the instantaneous speed of the chuck, so that deformation of or damage to the workpiece due to a too low or too high clamping force, are avoided.

The inventive structure further provides a large clearance area of the chuck without unfavorably affecting the guideways of the jaws. That is, the push bars and deflecting members are mounted to a large extent axially behind the jaws, so that a control member with a large diameter can be employed, which results in a large area of passage. Also, strong clamping forces are transmitted without problems since the component parts participating in the force transmission can readily be properly dimensioned.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
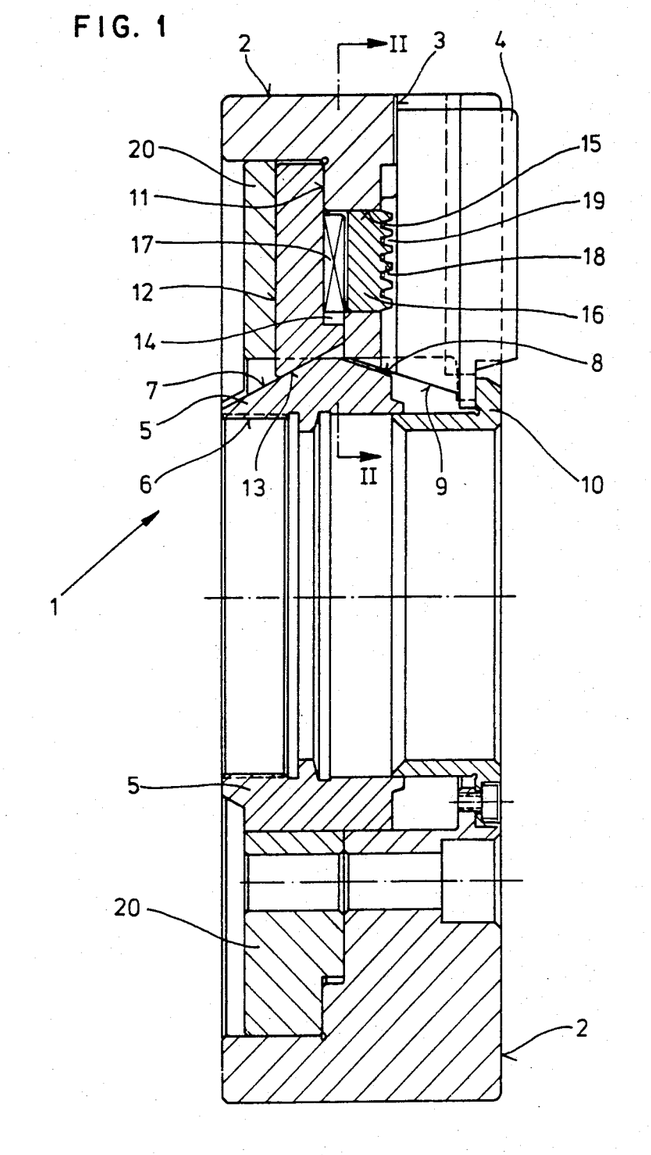
FIG. 1 is an axial sectional view of a power-operated chuck in which oblique surfaces are provided on the control member and on the intermediate members for their actuation.

Referring to the drawings in particular, the invention embodied therein in FIG. 1 comprises a power operated chuck generally designated 1 which includes a plurality of radially movable clamping or master jaws 4 which can be moved inwardly or retracted outwardly by a power operated control member 5 which is axially movable on the chuck.

The power chuck 1 shown in FIG. 1 is equipped with jaws 4, which are designed as master or clamping jaws and guided for radial displacement in grooves 3 which are provided in a chuck body 2. To actuate jaws 4, axially displaceable control member 5 is provided having a thread 6 into which a push rod (not shown) is screwed. The push rod is movable by means of a clamping cylinder which is also not shown.

To change the direction of and transmit the axial motion of control member 5, to jaws 4, intermediate members are provided in the form of push bars 12 which are received for displacement in additional grooves 11 of chuck body 2. Bars 12 cooperate, each by means of an oblique surface 13, with an oblique surface 7 provided on control member 5, and wedge bars 16 which are inserted tangentially to the axis of rotation of the chuck, in recesses 15 and are operatively connected to push bars 12 and jaws 4 through wedge drives. For this purpose, an extension 14 slanting in the displacement direction of wedge bars 16 is provided on each of the push bars 12 and engages in a groove 17 which is provided in wedge bar 16 (see FIG. 2). Wedge bars 16 are further provided with tooth strips 18 which are inclined in a direction opposite to that of groove 17 and cooperate with teeth 19 which are provided on jaws 4. Teeth 18 and 19 thus extend at an angle to the radial direction of the chuck 1.

Figure 2:
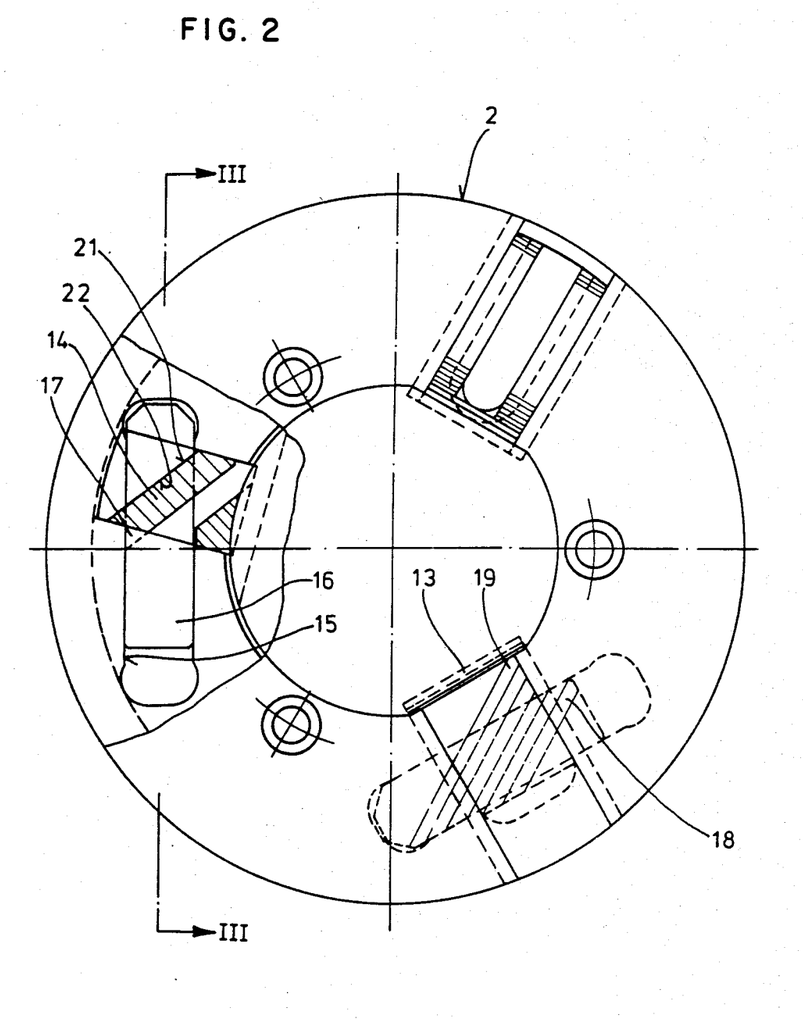
FIG. 2 is a front elevational view of the device shown in FIG. 1, partly in section and taken along the line II—II.
Figure 3:
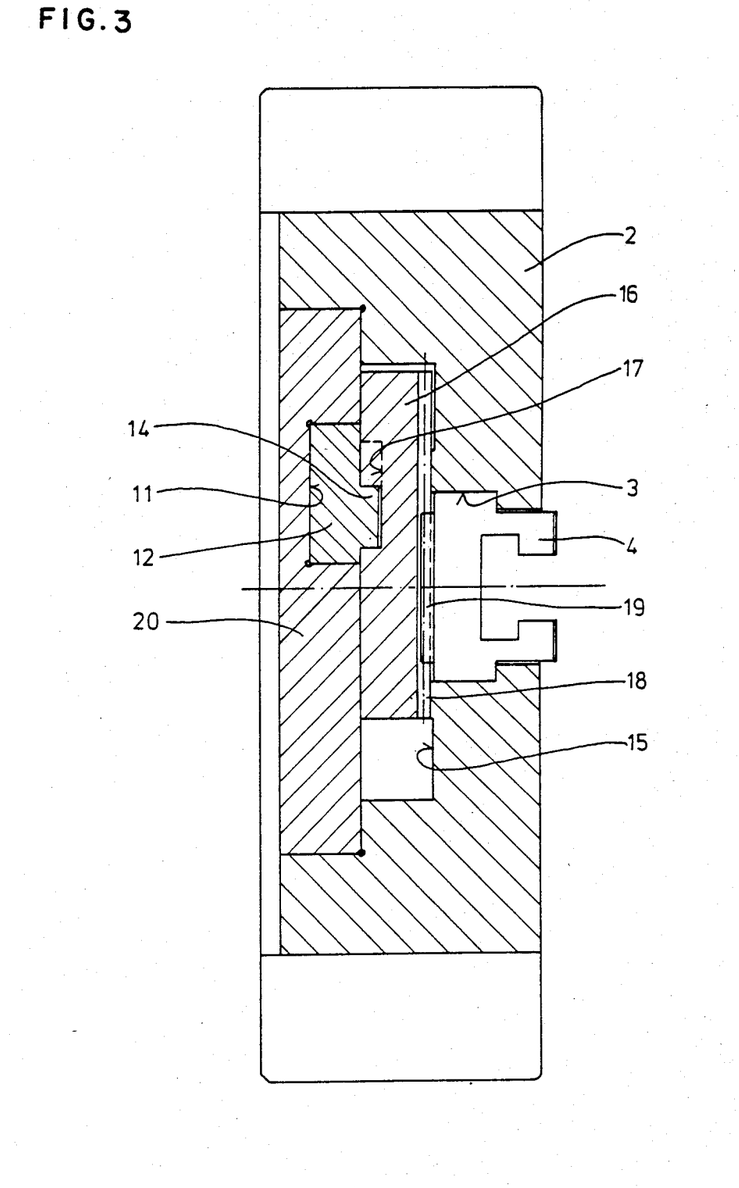
FIG. 3 is a sectional view taken along the line III—III of FIG. 2.

During a displacement to the left of control member 5 (FIG. 1) which is guided in a bushing 10 inserted in chuck body 2, push bars 12 which are received in grooves 11 that are closed by a cover 20, are pushed radially outwardly and the direction of their motion is changed by means of wedge bars 16. Through oblique surface 21 of extension 14, which cooperate with a mating surface 22 of groove 17, wedge bars 16 are displaced clockwise, as viewed in FIG. 2. Jaws 4 on the contrary, are pushed inwardly, against a workpiece to be clamped. Due to the inclinations of extension 14 and groove 17 associated therewith, and of teeth 18 and 19 acting relative to each other, the force can be transmitted to act in this changed direction. FIGS. 1 to 3 show the chuck with the jaws in their radially innermost position.

With chuck 1 in rotary motion, however, jaws 4 are subjected to a centrifugal force counteracting and thus reducing the inwardly directed clamping force. For the same reason, push bars 12 are subjected to centrifugal forces which are transmitted by wedge bars 16 to jaws 4, since bars 12 are not backed radially, and oppose the centrifugal thrust of jaws 4 because their direction is not changed. It is possible, of course, to provide such a mass of push bars 12 and such a wedge drive transmission ratio given by extension 14 and groove 17 as well as teeth 18 and 19 that the centrifugal forces of the jaws are entirely compensated for and that the applied clamping forces remain constant irrespective of the rotary speed of chuck body 2.

To retract jaws 4 and push bars 12 coupled thereto, the inner end of jaws 4 has an oblique surface 9 cooperating with a mating surface 8 provided on control member 5. By means of surfaces 8 and 9, however, jaws 4 may also be acted upon directly, to produce an internal stress. In such an instance, the centrifugal forces acting on jaws 4 are compensated for by means of push bars 12 and wedge bars 16, since the direction of the forces acting on push bars 12 is changed by wedge bars 16 and thus counteract the centrifigual forces of jaws 4. To avoid jamming, a little play is provided in the shown operating position between oblique surfaces 8 and 9 in FIG. 1.

Figure 4:
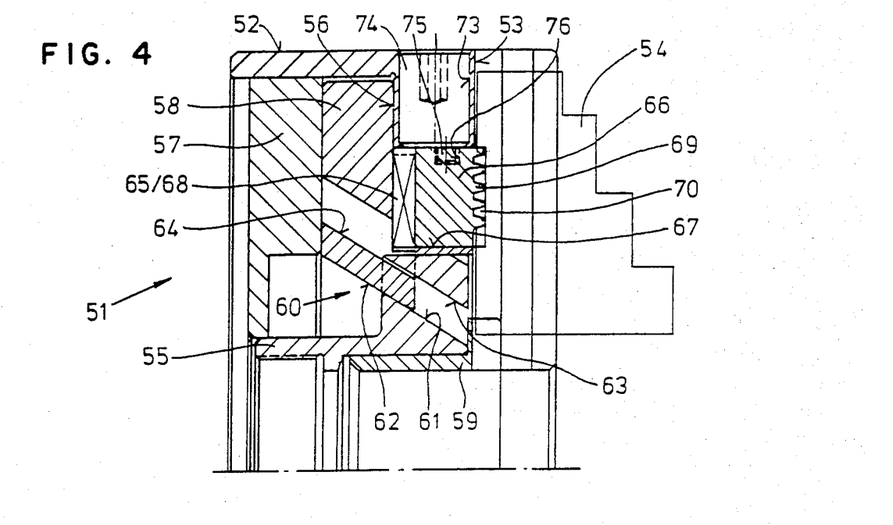
FIG. 4 is an axial view of a power chuck having intermediate members operatively connected to the control member through a wedge hook connection.
Figure 5:
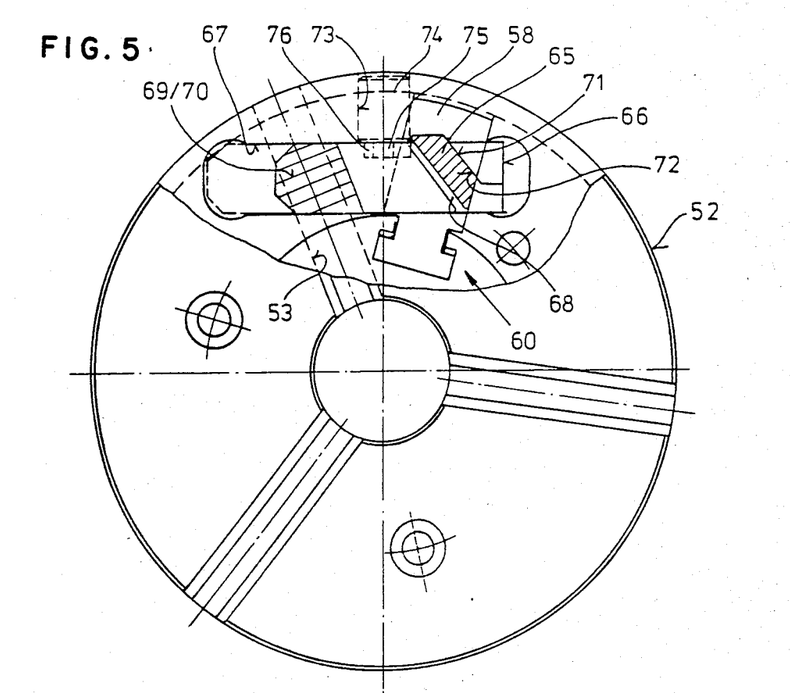
FIG. 5 is a front elevational view of the device shown in FIG. 4, partly in section.

In the power chuck shown in FIGS. 4 and 5, jaws 54 are also guided in radially extending grooves 53 of chuck body 52, and are actuated through intermediate members in the form of push bars 58 which are each connected by a wedge hook connection 60 to control member 55, and through wedge bars 66. During a displacement, push bars 58, which is received in further grooves 56 which are closed by covers 57, are pushed outwardly by means of oblique surfaces 61 provided on the control member 55 which is guided for axial displacement in chuck body 52 and in a bushing 59 inserted therein. Oblique surface 61 cooperate with the opposite surface 62 provided on push bars 58. Near wedge hook connection 60, further oblique surfaces 63 and 64 are formed on control member 55 and push bars 58, by means of which push bars 58 and jaws 54 coupled thereto are retracted as control member 55 is displaced to the left. Surfaces 61 and 62, as surfaces 7 and 13 in FIG. 1, act as engagement means between the control member and the push rod.

Wedge bars 66 which are provided for a positive connection between push bars 58 and jaws 54, are again inserted in recesses which extend tangentially to the axis of rotation and are provided on their front sides facing push bars 58 with a receiving groove 68 which is inclined relative to the direction of displacement and which is engaged by extensions 65 provided on each of push bars 58. During a displacement, oblique surfaces 71 and 72 apply against each other, and wedge bars 66 are operatively connected thereto through tooth strips 69 and toothing 70 which is provided on jaws 54.

To be able to compensate for the centrifugal forces acting on jaws 54, a small play is provided between oblique surfaces 63 and 64. Push bars 58 are thus not backed up radially outwardly, neither by chuck body 52 nor by control member 55. The centrifugal forces acting on push bars 58 are thus transmitted through tooth strips 66 also to jaws 54, only in a direction opposite to the centrifugal forces acting on the jaws, so that with a proper design of push bars 58 and of the wedge drives which are formed by extension 65 and groove 68 and toothings 69 and 70, the clamping forces exerted by jaws 54 are not reduced.

To be able to exchange jaws 54 in this embodiment, wedge bars 66 may be shifted in recess 67 so far as to disengage toothing 69 from toothing 70 of jaws 54. To this end, a bolt 74 is provided in a bore 73 of chuck body 52, which is rotatable and has an off-center extension 75 on its inner end. An angular recess 76 is provided in each of the wedge bars 66, into which extension 75 engages. In the end position of control member 55 and thus also at the end of the clamping range of wedge bars 66, bolt 74 can be turned, so that wedge bars 66 are disengaged from toothing 70 of jaws 54, and the jaws can be removed.

Figure 6:
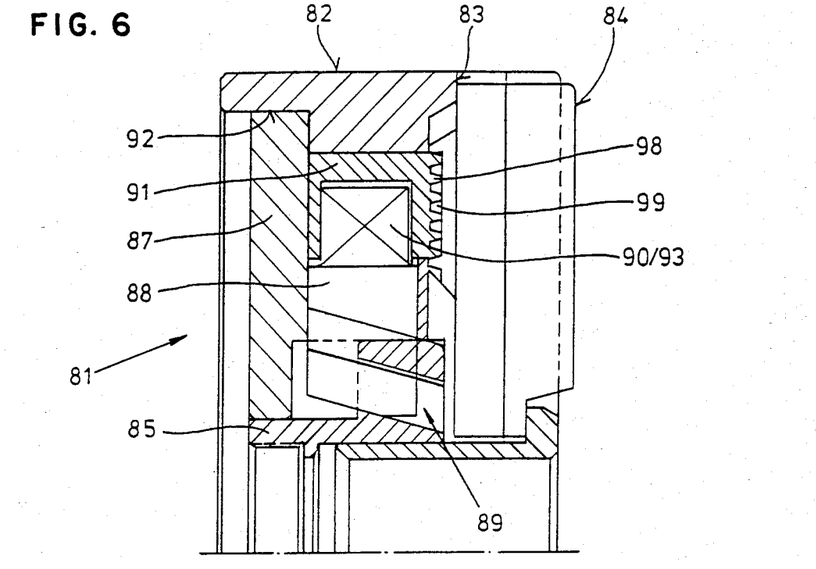
FIG. 6 is an axial view of a power chuck with a differently structured wedge drive for coupling the intermediate members to the wedge bars.
Figure 7:
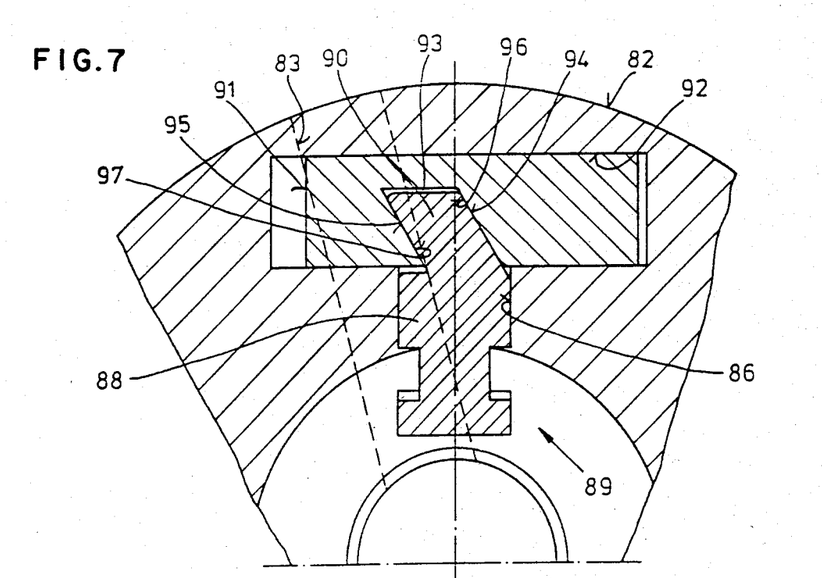
FIG. 7 is a longitudinal view of the device shown in FIG. 6.

According to FIGS. 6 and 7, a groove 93 is provided in chuck 81 for transmitting the movements of the intermediate members which are designed as push bars 88, to jaws 84 which are guided in grooves 83 of chuck body 82, which groove is provided in wedge bars 91 and inclined in the displacement direction thereof, and which is engaged by an extension 90 formed on the radially outward end of push bars 88. Oblique surfaces 94,93 of extension 90 cooperate with oblique surfaces 96 and 97 of groove 93. Through tooth strips 98, wedge bars 91 are operatively connected to jaws 84 carrying a toothing 99 for this purpose.

The movements of control member 85 are transmitted to push bars 88 which are guided in grooves 86 closed by a cover 87, through a wedge hook connection 89, so that the member can also be retracted in this way. And since push bars 88 are radially backed up by wedge bars 91, the produced centrifugal forces are transmitted to jaws 84 whereby the centrifugal forces acting on the jaws are compensated for.

Figure 8:
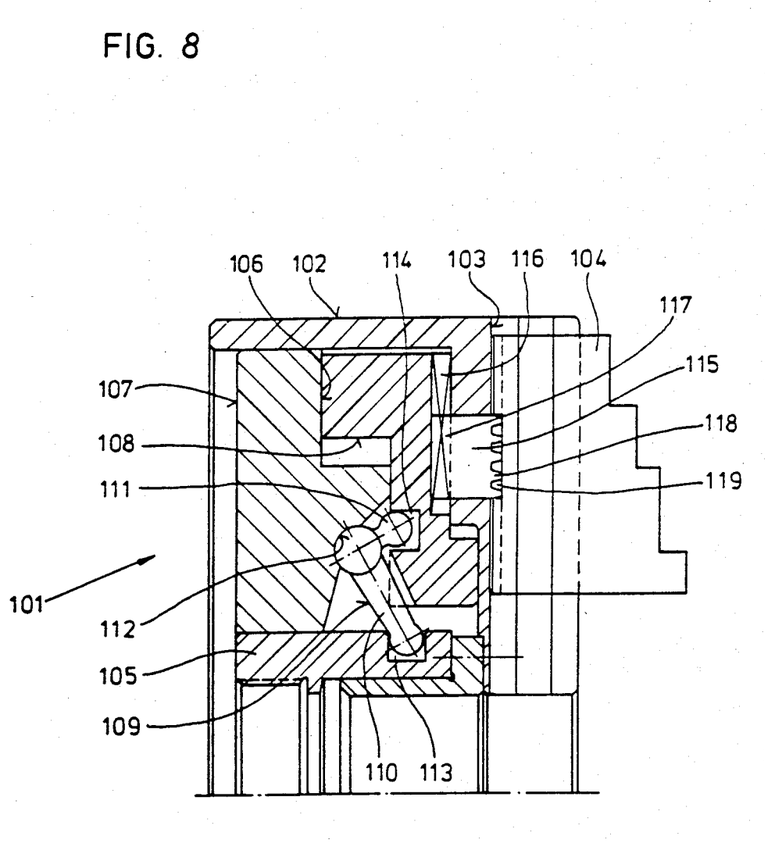
FIG. 8 is an axial view of a power chuck comprising a pivotally mounted reversal lever for connecting the control member to an intermediate member.

According to FIG. 8, a two-armed reversing lever 109 is provided for transmitting the axial displacement of control member 105, to push bars 108 as intermediate members. Lever 109 which is mounted for pivoting in a recess 112 of a two-part chuck body 102, 107, engages, by one of its lever arms 110, a recess 113 provided in control member 105, while its other end 111 engages a recess 114 provided in push bars 108.

By displacing control member 105 axially to the right, push bars 108 which are guided in grooves 106 are pushed outwardly and jaws 104 which are coupled to the push bars through wedge bars 115 and also retained in grooves 103 of chuck body 102, are displaced radially inwardly, to effect a clamping operation. In this case, a displacement of push bars 108 is transmitted to wedge bars 115 by means of an extension 116 engaging a groove 117 provided in the wedge bars which again are operatively connected to jaws 104 through tooth strips 118, 119.

Since recesses 114 of push bars 108 have a small clearance, the centrifugal forces acting on the bars are taken up through wedge bars 115 by jaws 104, so that the centrifugal forces acting on the jaws are compensated for.

While specific embodiments of the invention have been shown and described in detail to illustrate the application of the principles of the invention, it will be understood that the invention may be embodied otherwise without departing from such principles.

What is claimed is:

1. A power chuck for a turning machine comprising:
   a chuck body having an axis of rotation;
   at least one clamping jaw radially movably mounted to said body;
   a wedge bar movably mounted to said chuck body for tangential motion and engaged with said clamping jaw to move said clamping jaw radially inwardly and radially outwardly with movement of said wedge bar;
   a push bar radially movably mounted to said body, and engaged with said wedge bar so that movement of said push bar in one radial direction moves said clamping jaw in an opposite radial direction;
   a control member movably mounted to said body; and
   engagement means connected between said control member and saidl push bar for causing radial movement of said push bar in a first radial direction with movement of said control member so as to move said clamping jaw in an opposite second radial direction;
   whereby with rotation of said chuck body, centrifugal force acts radially on said push bar in an outward radial direction which applies an inward radial force to said clamping jaw.

2. A power operated chuck according to claim 1, wherein said control member is mounted for axial movement to said chuck body, said first radial direction being radially outwardly of said chuck body axis and second radial direction being radially inwardly of said chuck body axis.

3. A power operated chuck according to claim 2, wherein said wedge bar is mounted to said chuck body for substantially tangential movement thereof with respect to said chuck body axis.

4. A power operated chuck according to claim 3, including a tooth strip defined on facing surfaces of said wedge bar and clamping jaw and engaged with each other, each tooth strip including teeth extending at an angle to the radial direction of said chuck body.

5. A power operated chuck according to claim 4, wherein said engagement means comprises a first surface defined on said control member extending obliquely to said chuck body axis and a second surface defined on said push bar engaged with said first surface and extending in the same direction as said first surface.

6. A power operated chuck according to claim 5, wherein said control member includes a third surface extending obliquely to said chuck body axis and said push bar has a fourth surface facing and engageable with said third surface so that movement of said control member in one axial direction moves said push bar in said first radial direction by engagement between said first and second surfaces and movement of said control member in an opposite axial direction moves said push bar in said second radial direction through engagement between said third and fourth surfaces to retract said clamping jaw.

7. A power operated chuck according to claim 4, wherein said engagement means comprises a lever having two arms rotatably mounted to said chuck body, said control member engaged with one of said arms and said push bar engaged with another of said arms so that axial movement of said control member causes radial movement of said push bar.

8. A power operated chuck according to claim 4, wherein one of said push bar and wedge bar includes a groove defined therein and the other of said push bar and wedge bar includes an extension extending into and engaged with said groove, said groove extending at an angle to the radial direction of said chuck body, said and extension establishing engagement between said push bar and wedge bar.

9. A power operated chuck according to claim 8, wherein said groove and extension extend substantially perpendicularly to a direction in which said teeth of each tooth strip extend.

10. A power operated chuck according to claim 4, wherein said wedge bar includes a recess therein extending obliquely to the radial direction of said chuck body and facing radially inwardly of said chuck body, said push bar including an extension extending parallel and into said wedge bar recess, said push bar extension and wedge bar recess establishing engagement between said push bar and wedge bar.

11. A power operated chuck according to claim 1, wherein engagement between said push bar and wedge bar and engagement between said wedge bar and clamping jaw have a transmission ratio, said transmission ratio and a mass of said push bar and clamping jaws selected so that centrifugal force acting on said push bar and chuck bar counteract each other.

12. A power operated chuck according to claim 4, wherein said push bar includes on a radially inwardly end thereof a surface extending obliquely to said chuck body axis, said control member having a surface engaged with said clamping jaw surface for moving said clamping jaw in a radial direction by movement of said control member in an axial direction.

13. A power operated chuck according to claim 4, including a displaceable bolt engaged with said chuck body, said bolt having an eccentric cam extending therefrom said wedge bar including at a radially outwardly facing surface thereof a recess for receiving said cam, said cam rotatable into a position to move said wedge bar axially and disengage said tooth strip of said wedge bar from said tooth strip of said clamping jaw.

14. A power operated chuck according to claim 6, wherein said push bar includes a T-shaped portion extending radially inwardly with respect to said chuck body axis, said second and fourth surfaces of said push bar defined on said T-shaped portion.

* * * * *